Dec. 30, 1969     S. N. ROSCOE     3,486,815
NAVIGATIONAL AID Filed March 27, 1967     10 Sheets-Sheet 1

INVENTOR.
STANLEY N. ROSCOE,
BY
Walter J. Adam
ATTORNEY.

Dec. 30, 1969  S. N. ROSCOE  3,486,815
NAVIGATIONAL AID

Filed March 27, 1967  10 Sheets-Sheet 2

Fig. 2.

Dec. 30, 1969  S. N. ROSCOE  3,486,815
NAVIGATIONAL AID

Filed March 27, 1967  10 Sheets-Sheet 4

Dec. 30, 1969  S. N. ROSCOE  3,486,815
NAVIGATIONAL AID

Filed March 27, 1967  10 Sheets-Sheet 6

Dec. 30, 1969 S. N. ROSCOE 3,486,815
NAVIGATIONAL AID
Filed March 27, 1967 10 Sheets-Sheet 7

United States Patent Office 3,486,815
Patented Dec. 30, 1969

3,486,815
NAVIGATIONAL AID
Stanley N. Roscoe, Los Angeles, Calif., assignor to Hughes Aircraft Company, Culver City, Calif., a corporation of Delaware
Filed Mar. 27, 1967, Ser. No. 626,184
Int. Cl. G03b 21/14
U.S. Cl. 353—11                                    7 Claims

ABSTRACT OF THE DISCLOSURE

A navigation directing system that visually provides on a map display a segment of an overall selected route and a magnified indication of any error in present position of the craft relative to the route segment. The route segment indicator line has a position relative to an aircraft symbol representative of the error from the desired course. A vernier deviation indicator line is provided to move to positions from a gap in the center of the route segment line, at a magnified rate relative to the flight path error change indicated by the distance between the route segment lie and the aircraft symbol. The deviation indicator line moves in a lateral direction opposite from the direction of the aircraft symbol. A limit control is provided so that the vernier deviation line remains at the edge of the display during a large error condition.

Background of the invention

The invention relates to flight navigation systems and particularly to a system for presentation of a pictorial map display and a visual representation of a segment of a desired or commanded course as well as a continuous visual display of aircraft position and position error with respect to the commanded course during flight operation.

Flight navigation techniques employed today in the United States and in other countries utilize a system know as airway navigation which is coupled with ground controlled vectoring of in-flight aircraft to permit maximum efficiency of aircraft operation between origin and destination points. However, significant and important problems are becoming evident with this conventional type of navigation control. The substantial increase in aircraft traffic has resulted in an over-crowded condition on the airways and extremely dangerous as well as time-consuming and expensive crowded aircraft operation at points of origin and terminal points. This increase in air traffic has demanded an increased capacity in the ground control operation indicating that the ground control facilities may have to be enormously expanded and multiplied in the near future to meet prospective air traffic. Also, this conventional flight control system does not provide an optimum indication of flight path, desired path and flight path error. An alternative proposal would be advantageous that provides improved display concepts and equipment to increase the flight crew capabilities of controlled location during flight with a consequent reduction in the spatial requirements between aircraft occupying substantially contiguous airspace.

Conventional map type navigational display systems indicate desired or commanded flight paths by a command heading indication or a mark on the compass rose on the periphery of the display. Other course-deviation and directional indicators do not utilize a map type position presentation but do provide a directional error representation or deviation indication with reference to a desired radial flight path relative to a VORTAC facility by the direction of pointing of a needle or a line.

Summary of the invention

The present invention involves a navigation directing system that visually provides a segment of any particular desired course between origin and destination on a map display, a continuous display of the aircraft position relative to that course and a magnified indication of the aircraft deviation from that course. The navigation system of the invention displays directional information in an improved and easily readable manner to allow the desired course to be accurately maintained. The system of the invention thus provides the flight crew with the capability of flying along any commanded course (not limited to radial courses to or from VORTAC stations) by observing segments of the overall navigation path, offers the necessary heading information to maintain that course, and verifies in an improved manner that the desired course is actually being flown.

The system in accordance with the invention provides a visual display surface or display position that presents a map of the area over the proposed line of flight, or a navigational chart. Upon providing the desired origin and destination information to the computer, there is displayed on the screen a superimposed line which indicates a present segment or portion of the commanded or desired course to be flown between the selected origin and destination. The line which defines a segment of the direct course selected by the aircrew is herein termed a route segment indicator. This commanded or desired route indication is a visible line appearing on the visual display and is determined automatically by the geographical coordinates of the selected points of origin and of destination. Once the course line is defined, visible continuous information is fed to the display defining the position of the aircraft relative to the desired or commanded route segment at all times during aircraft flight operation.

Due to the fact that the scale factors employed in navigational charts have a relatively high ratio (such as one inch equaling 30 nautical miles), it has become apparent that exact information as to the specific position of the craft relative to the commanded course is difficult to visually discern. Accordingly, the present invention may utilize a segment of the displayed course line, the visual position relative to the commanded course being projected at a selected distance from the aircraft position which is a predetermined multiple of the displayed distance of the aircraft symbol from the route segment. This central line segment herein referred to as a vernier deviation indicator magnifies the displacement of the aircraft from the desired course by a relatively high numerical ratio, for example, 5 to 1. When the aircraft is on course, the vernier deviation indicator line is contiguous with separated portions of the route segment indicator line and provides confirming information that the craft is on course. Upon departure of the aircraft from the desired course, the vernier deviation indicator line magnifies that departure with a predetermined function and provides instant visible information of the departure as well as the direction of departure. The vernier deviation indicator is displayed on the side of the route segment line that is opposite from the aircraft position symbol and may be limited to maximum movement to a position at the edge of the display. A command heading indication may be provided whereby the craft may return to the desired route. Essentially, therefore, an error-free flight path control along adjacent segments of a predetermined route or course is provided. It is to be understood that although the navigation system is described relative to an aircraft, the principles of the invention are equally applicable to any type of navigation or route indication such as for ships or submarines.

It is therefore an object of this invention to provide an improved navigation control system.

It is a further object of this invention to provide an improved indication of a selected navigation route.

It is a still further object of this invention to provide an improved and continuous indication of flight path error.

It is another object of this invention to provide a navigation control system in which flight position error relative to a map is accurately and reliably provided.

Brief description of drawings

The novel features of this invention, as well as the invention itself, both as to its organization and method of operation, will best be understood from the accompanying description, taken in connection with the accompanying drawings, in which like characters refer to like parts, and in which.

Description of the preferred embodiment

The concept of the herein-disclosed invention relates to the provision of a visible display such as may be provided in a pilot's cockpit of an aircraft. The visible display utilizes a background map of a navigational chart employed in aircraft operation having superimposed thereon a displayed route segment of a great circle course between a start point and destination point. The segment of the displayed great circle course comprises a line herein sometimes referred to as a course line or route segment indicator (RSI). In one arrangement in accordance with the invention, the route segment indicator line is segmented, that is, a central portion of the visibly displayed line is independently position controllable on the display screen. This independently controllable segment of the direct course line from start point to destination is herein sometimes referred to as a vernier deviation indicator (VDI). It is to be noted that the principles of the invention also include a continuous route segment indicator line with the vernier deviation indicator line being a separate line that parallel joins the route segment indicator when the craft is flying on the desired path.

The concept of the invention in its operational mode may best be understood by assuming a typical cross-country aircraft flight from a start point to a destination point. The aircrew, upon beginning the flight on the ground at the start point causes an appropriate map to be displayed on the visual display screen indicating both the start point and destination. The equipment herein defined is operated by an appropriate computer which has programmed therein information identifying the geographical coordinates of the start point and destination point and upon start of a flight, that information defining a great circle course between the desired coordinates, is selected. In response to selection of the start point and destination, electrical signals may be generated to cause the optical projection of the route segment indicator and vertical deviation indicator onto the display screen or surface immediately prior to takeoff. With this information at hand, the compass heading to achieve the great circle course destination is visibly displayed to the crew. After takeoff, the computer receives a continuous in-flow of information relating to flight variables which would normally control the position of the aircraft relative to the desired course and location along that course. Such typical variables include true airspeed, and magnetic variation at given locales over the course, as well as compass deviation relative to the equipment on the aircraft. As a result of this information, the progress of the aircraft along its desired flight path is computed and related to the initially directed great circle course from start point to destination.

In response to the in-flight information received at the computer, signals are generated which indicate the variation of the actual position of the aircraft from the desired or commanded course. This indication is visibly disclosed to the crew in two modes, for example, the movement of the route segment indicator away from a central point on the display and a magnified movement of the vernier deviation indicator from superimposition with the route segment indicator. It is to be understood that although in the arrangement as described the present aircraft position is maintained at the center of the display, the principles of the invention include the concept of a movable aircraft symbol. Thus, course variations become immediately apparent to the crew together with the direction of variation enabling the crew to quickly and accurately return to the desired commanded course. Additionally, the visible variation of the aircraft from its commanded course will enable the crew to make appropriate heading corrections accurately compensating for drift and the like to minimize the need for continuous correction during flight.

Figure 1:
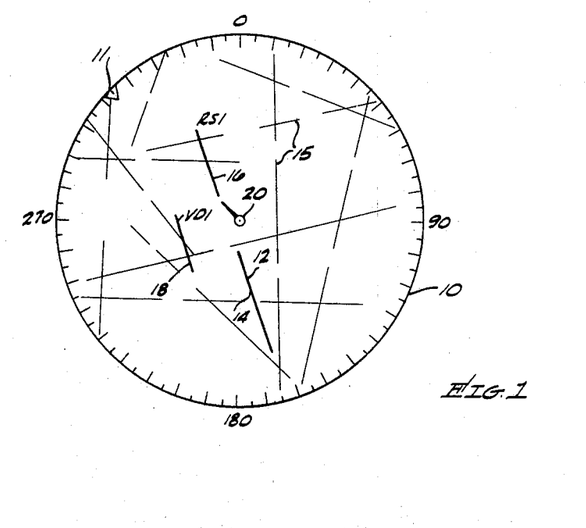
FIG. 1 is a plan view of a presentation, display screen or display surface in accordance with the invention.

Providing a more detailed description of the invention and directing attention to FIG. 1, numeral 10 indicates a visual display screen or panel of generally circular form and defining at its outer periphery a compass rose segmented into 360° with true north being directed upwardly, in the illustrated arrangement. A map or chart is displayed on the screen 10 as indicated by the lines 15.

Upon computation of a start point and direction, a route segment indicator (RSI) or a portion of a direct great circle course between start point and destination is projected on the display 10 and illustrated by the line 12. It is noted that the line 12 is segmented as shown by lines 14 and 16 and that the line has a lapse in continuity as a hiatus or gap exists in the central portion thereof. A vernier deviation indicator (VDI) segment of the route segment indicator 12 is shown as a line 18 in spaced relation to the hiatus in the route segment indicator 12. Such an indication, during flight, would indicate that the craft's present position is off the commanded course to the right requiring a left heading adjustment to bring the craft back onto the commanded course. Once the heading adjustment is made, the vernier deviation indicator segment 18 as a result of changes of the position of the craft and of continuous information input from the computer, would gradually move in the visible display to the right as shown in FIG. 1 until the craft reached the commanded course whereupon the ends of the segment 18 would be contiguous with the segments 14 and 16 of the RSI 12. This condition indicates to the crew that the craft is properly on the commanded course. At the same time, an aircraft present position symbol is positioned at the continuous lines 14, 18 and 16.

In accordance with the present invention, the projected route segment indicator line 12 and vernier deviation indicator line 18 move away from the visibly displayed aircraft symbol 20 as the aircraft's actual position varies from the commanded course. A command heading may be indicated by a symbol 11. It is a further feature of the invention that the vernier deviation indicator segment moves from the commanded course position at an artificially magnified rate and in a direction opposite from the indicated present aircraft position to thereby provide the crew with instant and easily discernible knowlege that aircraft heading correction is required. Also in accordance with the invention, the vernier deviation indicator line may have a limit as to its movement so that for a large flight error, the deviation indicator line remains at the edge of the display. To operatively illustrate this inventive concept, the structures hereinfter described are disclosed by way of illustration as different arrangements that may be utilized in accordance with the principles of the invention. It is to be understood that other modes of achieving the useful result may be utilized within the scope of the invention.

Figure 2:
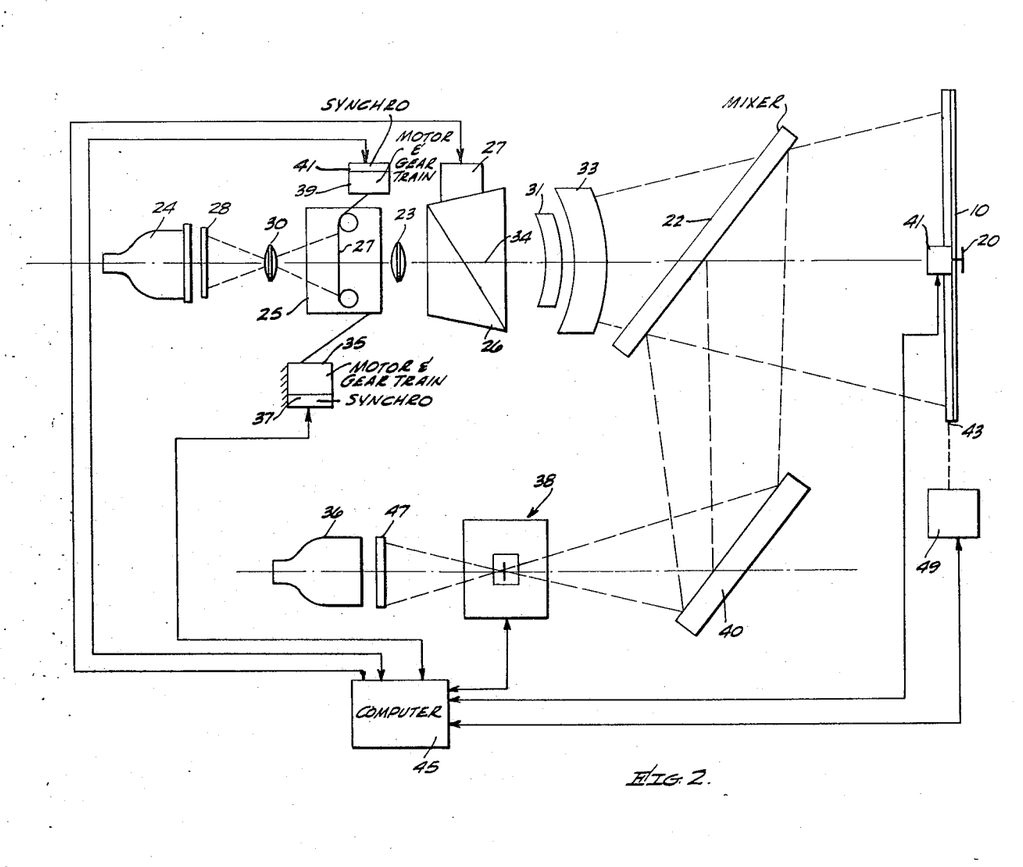
FIG. 2 is a schematic diagram of a typical optical system that may be employed in the invention.

Referring now to FIG. 2, the display screen 10 is shown receiving images from a mixer or light-passing mirror 22. A projection lamp 24 is appropriately arranged in determined physical relation with a map or film container 25, the latter being optically aligned on an axis 34 with a Pechan prism structure 26, focusing lenses 28, 30 and 23, diverging lenses 31 and 33, and the light-passing or semi-reflective mirror or mixer 22. The mirror 22 is angularly arranged in relation to the axis 34 of the map projection optical system and accommodates passage as well as reflection of light applied thereto. For example, the mirror 22 may have a transmissivity of 50 percent and a reflectively of 50 percent of the applied light energy. It will be understood that an appropriate map is stored on a film 27 in container 25 and will thus be projected upon the display screen 10 through the structure described. Motor and gear trains 35 and 39 control the respective X and Y positions of the film 27 in response to respective synchro circuits 37 and 41.

A second optical system includes a second lamp 36 and a focusing lens 47, both being optically arranged with a symbol generator structure indicated generally by a box 38. A reflecting mirror 40 is optically aligned with the mirror 22 so that route segment and vernier deviation course lines projected by lamp 36 will reflect from the mirror 40 and partially from the mirror 22 for focusing on the display screen 10. Thus, the map and course lines, after being mixed in the partially reflective mirror 22, concurrently appear on the visual display screen 10 as shown in FIG. 1. A computer 45 applies control signals to the symbol generator 38 and controls the synchro circuits 37 and 41. For rotating the map display on the screen 10, a synchro circuit and motor and gear train shown as 27 is coupled to the Pechan prism 25 and responding to the computer 45. The present position symbol 20 may be mounted on the screen 10 and controlled by a synchro circuit and a motor and gear train shown at 41 and responsive to the computer 45. For developing a command heading indication (FIG. 1), a ring 43 may be provided and controlled by a suitable synchro circuit, motor and gear train shown as unit 49 and controlled by the computer 45.

Figure 3:
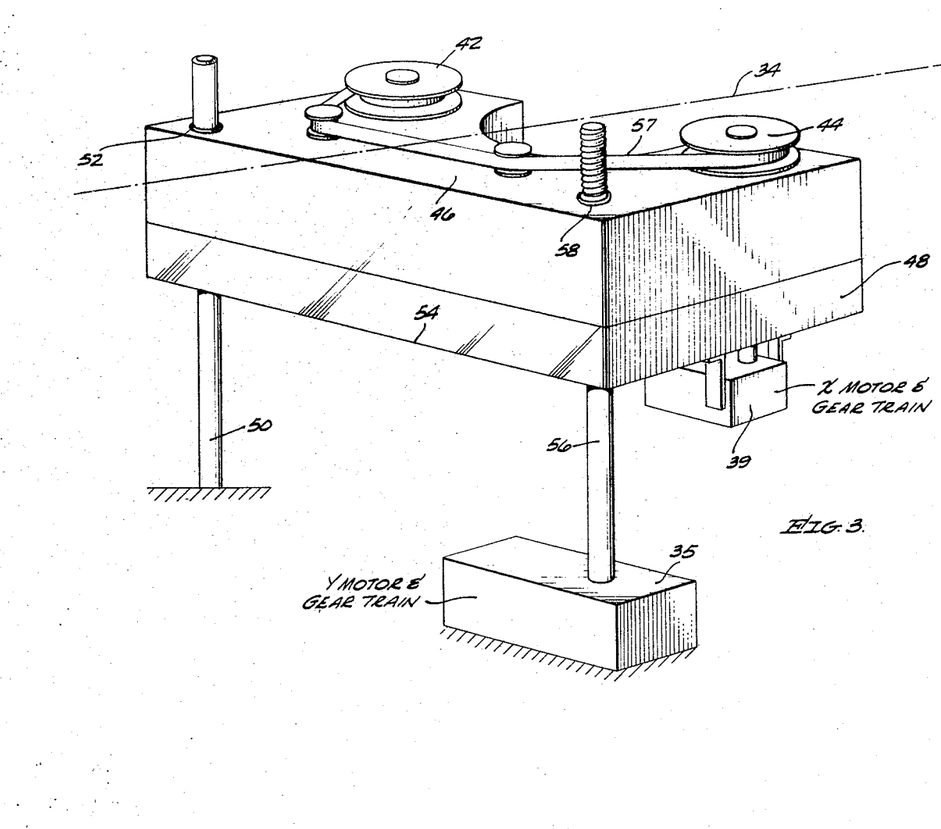
FIG. 3 is a perspective view of the film control system of FIG. 2.

Referring now also to the perspective view of FIG. 3, the film 27 is retained on spools 42 and 44 suitably mounted on a plate structure 46. A suitable gear train 48 interconnects the spools 42 and 44 so that both rotate an equal amount in either direction. The motor and gear train 39 is coupled to the gear train 48 to control the position of the film 27 in the X dimension. The motor and gear train 39 may be mounted to a structure 54 positioned below the gear train 48 and suitably attached to the plate structure 46. A fixed post 50 is provided with a ball bearing case 52 that is freely movable therealong and mounted to the structure 46. A lead screw 56 is coupled to the motor and gear train 35 which in turn is fixedly mounted on the craft. A ball nut 58 is threaded on the lead screw 56 and mounted on the structure 46 so that rotation of the screw 56 provides movement of the film 27 in the Y direction.

Figure 4:
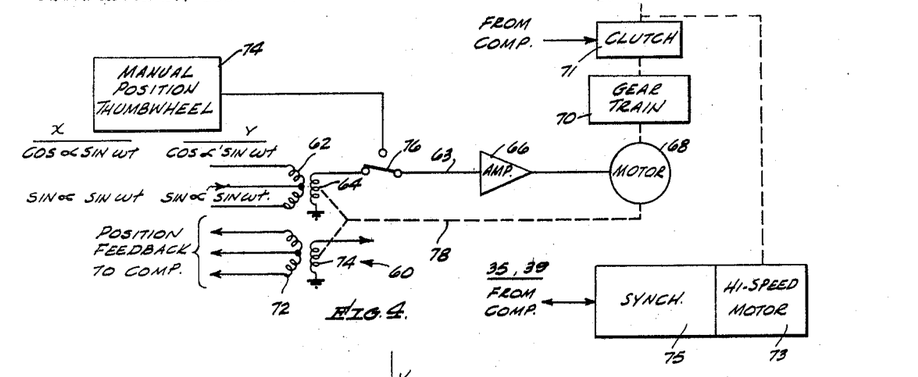
FIG. 4 is a schematic diagram of a synchro and motor control arrangement that may be utilized in the system of FIG. 2.
Figure 5:
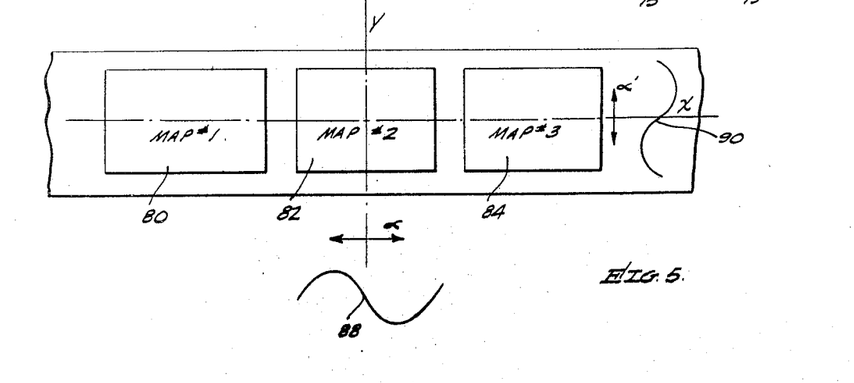
FIG. 5 is a schematic diagram for explaining the servo and manual control of the film utilized in the projector of FIG. 2.

Referring now also to FIGS. 4 and 5, a resolver 60 includes windings 62 and 64 which apply a signal to a lead 63 and through an amplifier 66 to a motor 68. A gear train 70 responds to the motor 68 and controls, through a clutch 71, the spool 44 or the lead screw 56 depending upon whether the circuit of FIG. 4 is in the motor and gear train circuit 35 or 39. The synchro circuit 60 includes windings 72 and 74, the latter being coupled between ground and a suitable +26 volt source of potential. A mechanical link 78 interconnects the motor 68 and the windings 64 and 74. For operation to control X movement for the unit 39, signals $\cos \alpha \sin \omega\tau$ and $\sin \alpha \sin \omega\tau$ are applied to the winding 62 and for operation to control the Y movement, signals $\cos \alpha' \sin \omega\tau$ and $\sin \alpha' \sin \omega\tau$ are applied to the winding 62. The radian frequency of $\omega$ is selected for reliable operation and the angles $\alpha$ and $\alpha'$ represent X and Y positions on the film frame. A manual position thumbwheel 74 and a switch 76 on the lead 63 are provided to control manual movement of the film 27. The winding 72 provides position feedback signals to the computer 45. Operation of this type of synchro circuit is well known in the art and will not be explained in further detail. For changing frames, either automatically or in response to the pilot, high speed motor and gear train 73 and a synchro circuit 75 respond to the computer 45 which also operates the clutch 71 to disconnect the gear train 70. It is to be noted that the synchros such as 27, 41 and 45 may be similar to that shown in FIG. 4 except only a null voltage such as from the lead 63 at the input of the amplifier 66 is fed back to the computer.

The film 27 may include first, second and third frames 80, 82 and 84 as shown in FIG. 5, each of which is selectable in response to the high speed motor 73. Upon a selection of a frame, the computer input signals control the X and Y positions of the map by a combination of the two signals 88 and 90 as determined by the respective angular values of $\alpha$ and $\alpha'$.

Figures 6, 7:
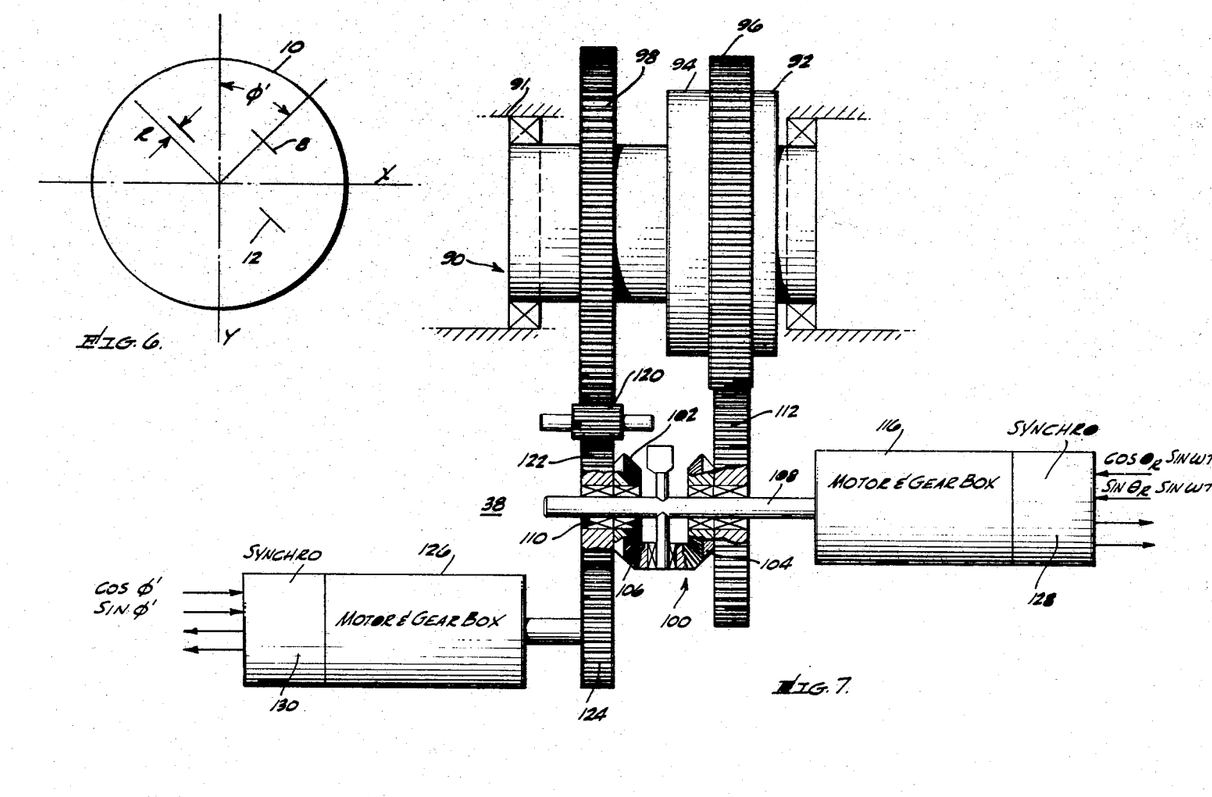
FIG. 6 is a schematic diagram of the display surface provided in the system of FIG. 2.
FIG. 7 is a schematic diagram of the symbol generator and control system therefore as utilized in the system of FIG. 2.

Referring now to FIGS. 6 and 7, the screen 10 is shown with an X and a Y axis to further explain the operation of the symbol generator 38. The angle $\phi'$ is the rotational angle of the indication lines 12 and 18 and the distance R is the distance of the line 12 from the present aircraft position which is the center of the screen in the illustrated system. It is to be noted that the line 18, which is a fixed multiple of R, does not have to be separately controlled from the computer in the illustrated system. A projector 90 includes symbol plates and lenses as will be explained subsequently with the position of the symbol plates controlled by internal cams 92 and 94. A gear 96 is attached to the cams 92 and 94 controlling the dimension R with the angle of rotation thereof to the segmented line 12 and the distance to the line 18 which is a predetermined multiple or function of R. A gear 98 is mounted on the body of the projector 90 and the angular position thereof determines the angle $\phi'$ which is related to the direction of the commanded navigation route relative to the displayed map. A differential gear structure 100 is provided including bevel gears 102, 104 and a spider gear 106 with the gears 102 and 104 rotatably mounted with bearings on a shaft 108 and gear 106 rotatably mounted by bearing on a shaft 110 which in turn is fixedly mounted to the shaft 108. A gear 112 is provided to mesh with the gear 96 and rotates on the shaft 108 in response to a motor and gear train 116 providing rotation of the bevel gear 104. The gear 98 is controlled through a suitably mounted idler gear 120 by a gear 122 rotatably mounted on the shaft 108 by suitable bearings. A drive gear 124 responds to a motor and gear train 126 to rotate the gear 122, the gear 98 and to rotate the bevel gear 102, the gears 106, 104, 112 and 96 and to control the angle $\phi'$ as the structure 90 rotates on a fixed housing structure 91. The bevel gears 102 and 104 are fixedly mounted to respective gears 122 and 112. Rotation of the motor 126 rotates both the gears 96 and 98 to control the angle $\phi'$ and rotation of the motor 116 moves the gear 106 to rotate the gear 104 in a differential action and rotate the gear 112. Suitable synchro circuits 128 and 130 are coupled to respective motor and gear train units 116 and 130 and are each similar to that shown in FIG. 4. The synchro circuit 128 receives signals $\cos \theta_R \sin \omega\tau$ and $\sin \theta_R \sin \omega\tau$ from the computer 45 (FIG. 2) and supplies position feedback signals thereto. The value $\theta_R$ is an angle proportional to range. The synchro circuit 130 receives $\cos \phi'$ and $\sin \phi'$ signals from the computer 45 and supplies position feedback signals thereto.

Figure 8:
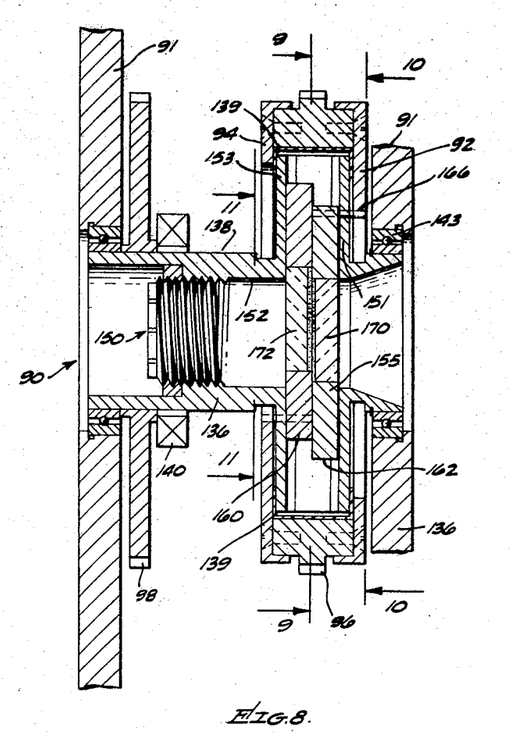
FIG. 8 is a broken away side view of the optical system of FIG. 7 for forming the route segment and course deviation symbols.

Referring now to FIG. 8, the display control projector 90 includes the housing 91 having a display mechanism as indicated generally at 138 rotatably mounted thereto by suitable ball bearing structures 142 and 143. Thus, the entire mechanism is free to rotate within the housing 91 in response to movement of the gear 98 which is fixedly mounted to an extending structure 136 of the mechanism 138 by an appropriate clamp 140. The gear 96, which is rotatably mounted to the structure 138, also moves with the gear 98 so that the R dimension does not vary with angular movement. Mounted within the cylindrical structure 136 is a lens 146 which in response to the lamp 24 (FIG. 2), results in a light beam being projected through the cavities 150 and 152 of the structure 138. A peripheral flange 151 is provided extending radially outward from the structure 138 and fixedly mounted to a circular flange structure 153 of the structure 138. The flange 151 is generally circular in form and is provided with an elongated cavity or slot 155 which provides a slide area for a pair of reticle holders 160 and 162. The reticle holders 160 and 162 are free to move in the elongated cavity 155 and are parallel to the axis thereof. Projecting pins 164 and 166 are provided at the ends of respective reticle holders 160 and 162 and ride on the inner surface of respective internal cams 94 and 92. A coiled spring 171 (FIG. 9) interconnects the pins 176 and 178 to bias the reticle holder 160 upward and the reticle holder 162 downward in the side view of FIG. 8. The cams 94 and 92 and the gear 96 are bolted together to form a unit rotatable on a bearing surface 139 provided on the periphery of the flange 153 and the flange 151. The bearing 153 may be a suitable dry lubrication or a Teflon material as is well known in the art.

Figure 9:
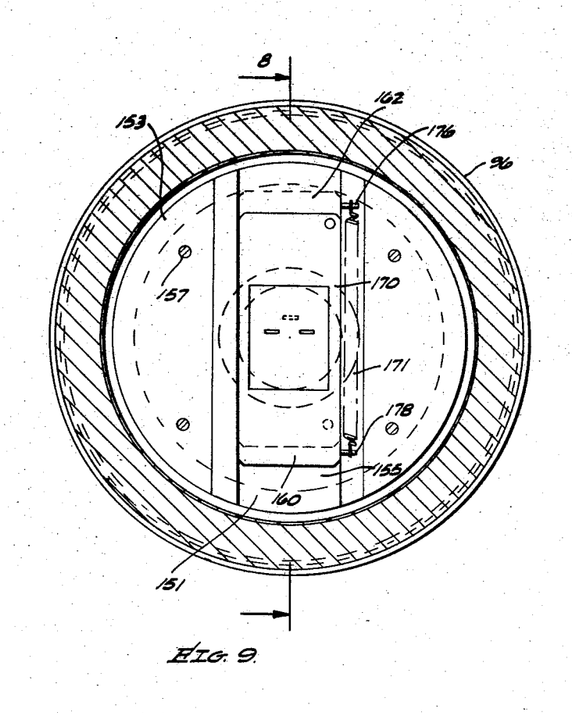
FIG. 9 is a sectional view of the symbol generator taken along line 9—9 of FIG. 8.
Figures 10, 11, 12, 13:
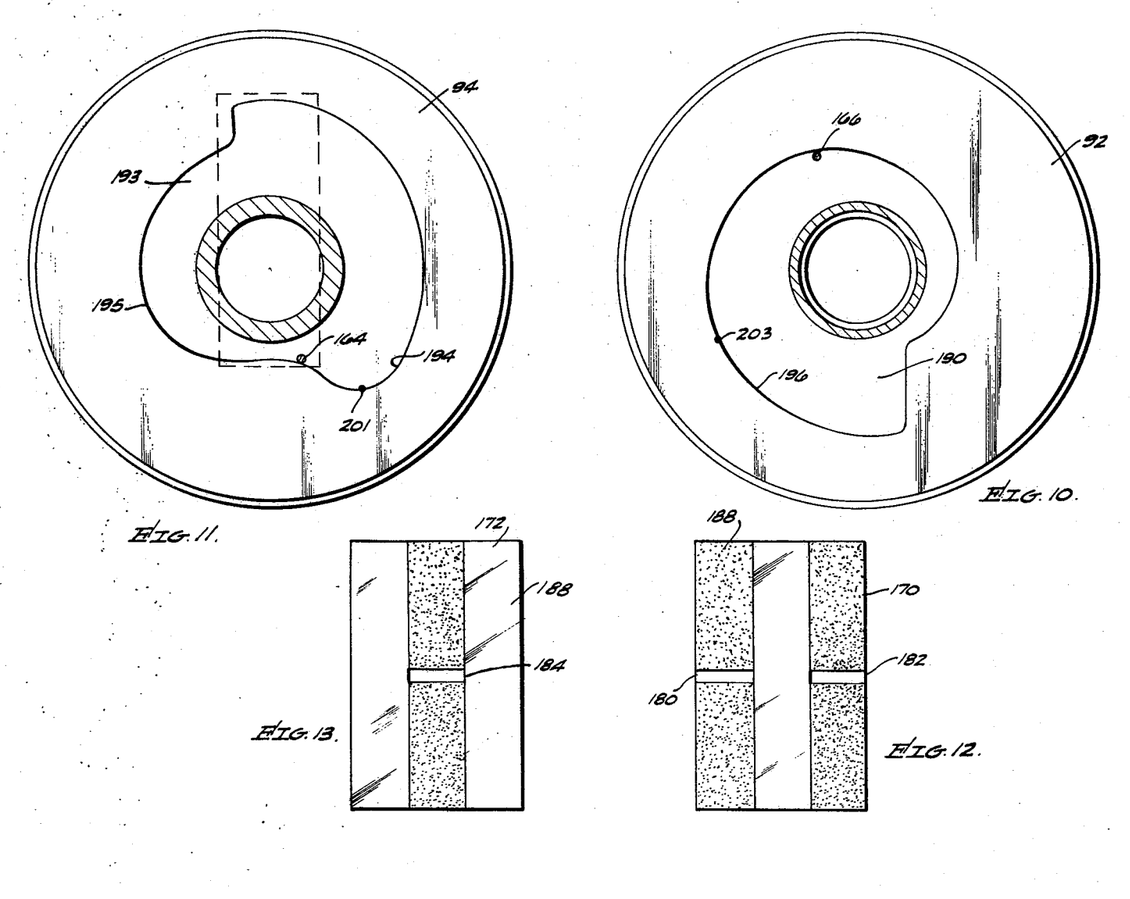
FIG. 10 is a sectional view of the symbol generator taken along line 10—10 of FIG. 8 and showing the route segment indicator cam.
FIG. 11 is a sectional view of the symbol generator taken along line 11—11 of FIG. 8 and showing the vernier deviation indicator cam.
FIG. 12 is a detail plan view of one reticle element employed in the system of FIG. 8 for forming the route segment indicator line.
FIG. 13 is a detail plan view of a second reticle element employed in the system of FIG. 8 for forming the vernier deviation indicator line.

As shown in FIG. 9, the spring 171 is coupled to pins 176 and 178 in turn mounted on respective plates 162 and 160. The slot 155 of the flange 153 contains the reticle holders 162 and 160 each of which may include a respective reticle plate 170 and 172. Referring temporarily to FIGS. 12 and 13, the reticle plate 170 includes lines 180 and 182 and the reticle holder 172 includes a line 184. The plates 170 and 172 may be formed of a normally transparent material such as a plastic or glass, having a major portion of the surface aluminized as at 188 to render it opaque. The clear areas of lines 180, 182 and 184 pass light therethrough to define the route segment and vernier deviation lines regardless of the relative position thereof. The plates 170 and 172 when in surface abutting juxtaposition, may be moved so that the slot 184 is longitudinally aligned with the opaque segment between the transparent slots or lines 180 and 182. Thus, as the reticle holders 160 and 162 move longitudinally in the cavity 152 to a central point, the slot 184 may be contiguously aligned with the slots 180 and 182 to present in the plane of projection, a continuous line accommodating the passage of light therethrough. The light passing through the slots 180 and 182 when projected to the viewing screen 10 (FIG. 2) will define the route segment lines 14 and 16 (FIG. 1), and the slot 184 when projected as shown in FIG. 2, will define on the screen 10 the vernier deviation line 18. The flange 151 is mounted to the flange structure 153 by suitable bolts indicated at 157 of FIG. 9 so that the reticle holders 160 and 162 are retained in the cavity 155.

Referring now principally to FIGS. 10 and 11, the cams 92 and 94 are formed of plates which define respective cam openings 190 and 193. The vernier deviation cam 92 has an internal surface 196 and the route segment cam 94 has an internal surface 194 on which respective pins 166 and 164 ride. Each surface 194 and 196 controls movement of the lines on either side of the center or crossover point so that rapid 180 degree rotation of the structure is not required. The slope of the surface 194 is a selected multiple or function of the slope of the surface 196, such as five times the slope. Also in accordance with the invention, the slope of the surface 194 may be an exponential or any varying function of the slope of the surface 196 so that a small deviation of flight path is shown magnified at a greater proportional rate than a large deviation of flight path. A limit surface 195 and 199 of the cam 94 is provided so that no pin movement is provided along the slot and the vernier deviation indicator line will remain at the edge of the screen 10 for large flight position errors. During this condition, only the route segment indicator will move outward in response to additional flight position error. Points 201 and 203 are the center or crossover position of the surfaces 194 and 196. Limit surfaces are also provided for the cam 92 to limit the maximum movement of the route segment indicator line to the edge of the display surface. In the illustrated arrangement, the variation in rise and fall of the cam surfaces is such that the reticle holder 160 though moving in the same direction as the reticle holder 162, will consistently move at a rate that is five times greater than that of the reticle holder 162 (except at the limit). It will thus be apparent that any movement of the projected route segments 14 and 16 and vernier deviation indicator segment 18 on the screen 10 will be in identical direction from the center of the display, but the vernier segment 18 will have a movement that is clearly magnified. Thus, as shown in FIG. 2, the map is projected on the screen 10 at a changing position relative to the aircraft position indication 20 at the center of the screen so that the present position is presented on the display. The route segment indication lines are controlled to indicate the actual commanded or desired route relative to the projected map with the vernier deviation indicator line 18 magnifying any error in aircraft deviation from the commanded route.

Figure 14:
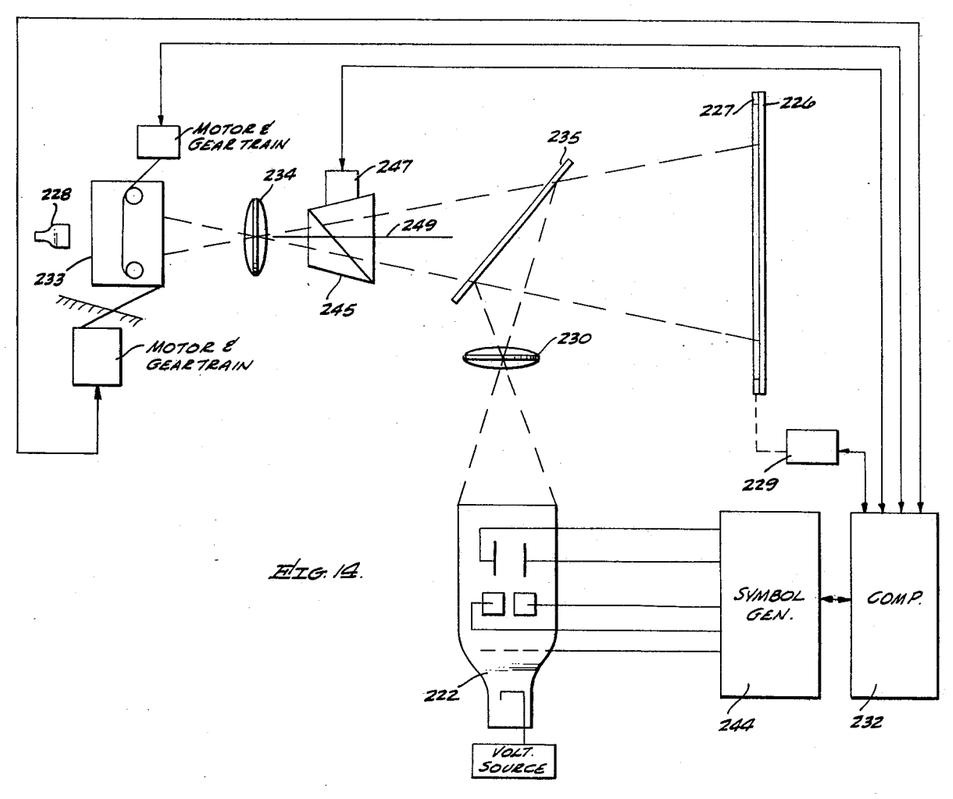
FIG. 14 is a schematic diagram of the navigation director system utilizing a cathode ray tube in accordance with the principles of the invention.

Referring now to FIG. 14, another arrangement of the navigation system in accordance with the principles of the invention includes a suitably biased cathode ray tube 222 controlled by a symbol generator 224 to provide the route segment and vernier deviation symbols. A screen 226 similar to that shown in FIG. 1 receives projections both from a lamp 228 and from the cathode ray tube 222. A command symbol ring 227 may be provided at the screen 226 rotated by a suitable motor, gear train and synchro circuit indicated by a box 229 and responsive to a computer 232. The symbols, as retained on the screen of the cathode ray tube 222, are focusing in a lens system 230 and reflected from a mixer or semitransparent mirror 235 onto the screen 226. A map projecting enclosure 233 including motor, gear trains and synchro circuits is similar to that shown in FIG. 3 receiving X and Y control signals from the computer 232 which also provides control signals to the symbol generator unit 244. A suitable lens system 234 and a Pechan prism 245 are provided on an optical axis 249 between the map projector 26 and the mirror 232. A suitable control unit 247 including a motor, gear train and synchro circuit may couple the prism 245 and the computer 232 to allow rotation of the projected chart or map. The map projection is passed through the semi-transparent mirror 235 and in combination with the reflected symbol projection is applied to the screen 226.

Figure 15:
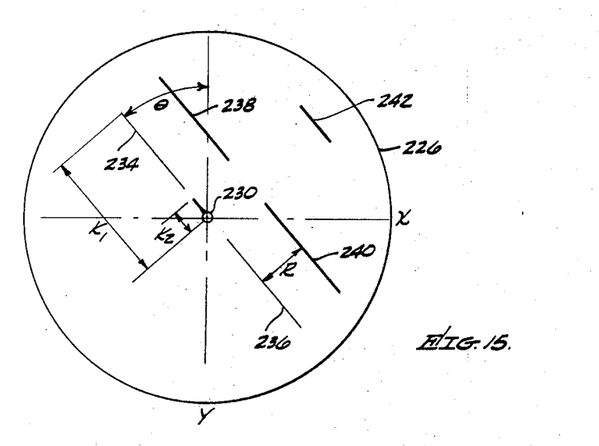
FIG. 15 is a schematic diagram of the display surface of FIG. 14 for further explaining the generation of the route segment and vernier deviation indications.
Figures 16, 18:
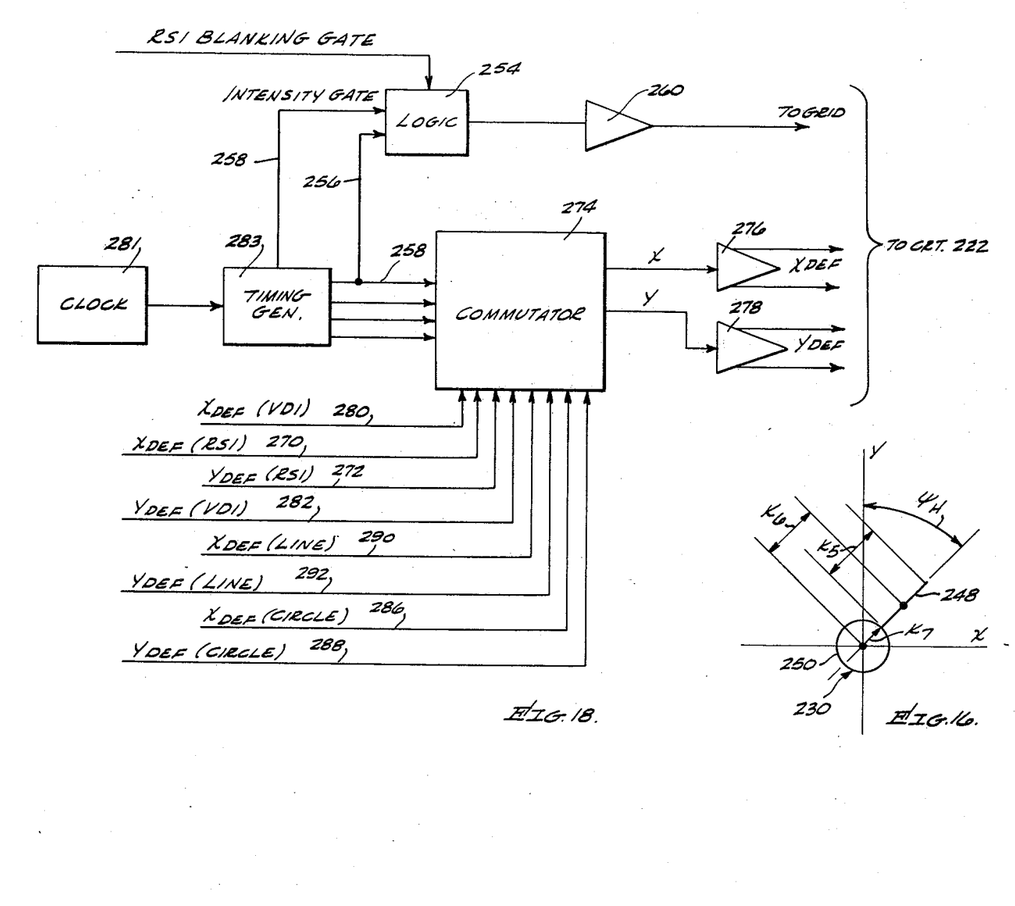
FIG. 16 is a schematic diagram of a portion of the display surface of FIG. 14 for explaining the generation of the present aircraft position symbol.
FIG. 18 is a schematic block diagram of a second portion of the control system for the cathode ray tube utilized in the system of FIG. 14.

Referring now to FIG. 15, the screen 226 is shown to explain the generation of the symbols thereon by the cathode ray tube 222. It is to be noted that the maps or charts are projected on the screen 226 similar to that shown in FIG. 1. For explanatory purposes, an X and a Y axis are shown passing through an aircraft symbol formed of a circle and a line connected thereto pointing in a direction representative of the actual direction of aircraft flight relative to the displayed map. Route segment indicator lines 234 and 236 have an angle $\theta$ relative to the Y axis and are at a distance R from the center point at the aircraft symbol 230 as shown by the route segment lines 238 and 240 at an off course position. A vernier deviation line 242 is shown at an error indicating position relative to the lines 238 and 240. Constant $K_1$ and $K_2$ are selected to control half of the length respectively of the lines 234, 236 and the line 242. The computer 232 may limit the distance of movement of the deviation line 242 in accordance with the invention. Referring also to FIG. 16, which is an enlarged view of the aircraft symbol 230, a direction line 248 is provided at an angle $\psi_H$ relative to the Y axis with constants $K_5$, $K_6$ and $K_7$ respectively representing the length of the line 248, the distance from the center of the screen to the center of the line 248 and the radius of a circle 250.

Figure 17:
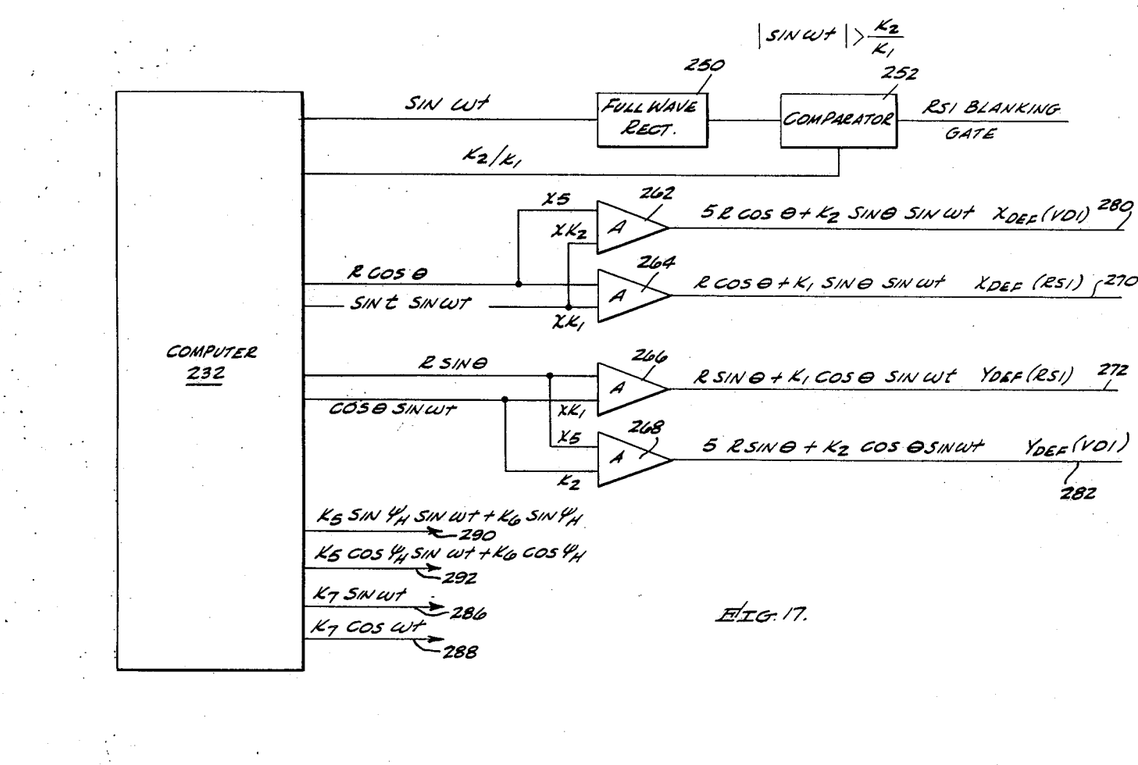
FIG. 17 is a schematic block diagram of a first portion of the control system for the cathode ray tube utilized in the system of FIG. 14.

Referring now to FIGS. 17 and 18, the computer 232 develops a signal $\sin \omega\tau$ at a selected radian frequency $\omega$ which is applied through a full wave rectifier 250 to a comparator circuit 252 also receiving a signal $K_2/K_1$ from the computer. The comparator 252 develops a route segment indicator blanking gate when $$|\sin\omega\tau| > K_2/K_1$$

The route segment blanking gate signal is applied to a logic circuit 254 also receiving an RSI timing gate on a lead 256 and an intensity gate on a lead 258. The logic circuit 254 may include a first "and" gate (not shown) responsive to the intensity gate signal on the lead 258. A clock 281 and a timing generator 283 provide the timing signals. The route segment blanking gate and the timing gate signals are applied to a second "and" gate which applies the output signal through an inverter to the first "and" gate. Blanking signals are applied from the first "and" gate through an amplifier 260 to the grid of the cathode ray tube 222 (FIG. 14) during a period of forming the route segment indicator line and during the time of developing the length of the center line or the gap of the route segment indicator line. It is to be understood that other suitable blanking such as for retrace is applied to the grid of the tube 222.

For forming the route segment and flight path deviation lines, amplifier circuits 262, 264, 266 and 268 are provided to control the gain of the imput signals and perform a summing operation such as by a conventional resistor summing network (not shown). The computer applies a signal $R \cos \theta$ to the amplifier 262 where it is multiplied by the factor 5 and to the amplifier 264 where multiplication is not provided to that signal. The signal $\sin \theta \sin \omega\tau$ is applied to the amplifiers 262 and 264 where they are respectively multiplied by $K_2$ and $K_1$. The computer applies a signal $R \sin \theta$ to the amplifier 266 and to the amplifier 268 which multiples the signal by a factor of five. The signal $\cos \theta \sin \omega\tau$ is applied to the amplifiers 266 and 268 where they are respectively multiplied by constants $K_1$ and $K_2$. For forming the route segment line, amplifiers 264 and 266 apply X deflection signal $R \cos \theta + K_1 \sin \theta \sin \omega\tau$ and Y deflection signal $R \sin \theta + K_1 \cos \theta \sin \omega\tau$, through respective leads 270 and 272 to a commutator 274, which signals ($X_{DEF}$ and $Y_{DEF}$) are applied to respective X and Y deflection amplifiers 276 and 278 and in turn to opposite plates of the cathode ray tube 222. For forming the vernier deviation line, amplifiers 262 and 268 apply respective X deflection signal $5R \cos \theta + K_2 \sin \theta \sin \omega\tau$ and Y deflection signal $5R \sin \theta + K_2 \cos \theta \sin \omega\tau$ through respective leads 280 and 282 to the commutator 274 for application to the deflection plates of the cathode ray tube 222.

Figure 19:
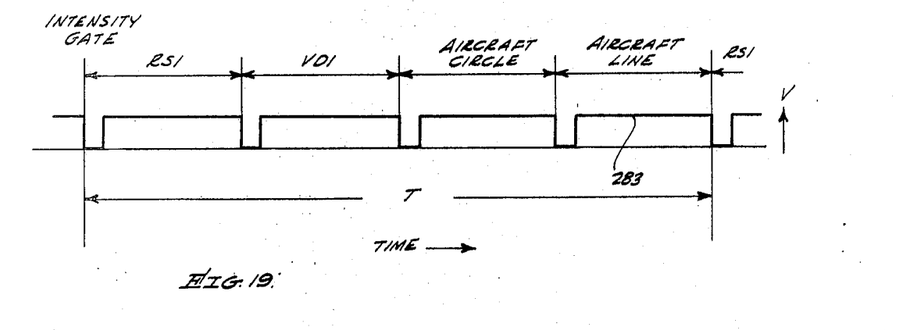
FIG. 19 is a schematic diagram of time versus intensity of further explaining the operation of the system of FIG. 14.

The circle 230 at the center of the screen may be formed by signals $$X_{DEF} = K_7 \sin \omega\tau$$
$$Y_{DEF} = K_7 \cos \omega\tau$$

applied from the computer 232 through respective leads 286 and 288 to the commutator 274. The line 248 (FIG. 16) is developed by signals $$X_{DEF} = K_5 \sin \psi_H \sin \omega\tau + K_6 \sin \psi_H$$
$$Y_{DEF} = K_5 \cos \psi_H \sin \omega\tau + K_6 \cos \psi_H$$

applied from the computer respective leads 290 and 292 to the commutator 274. As shown in FIG. 19, the timing may be divided into four intervals of time indicated generally by a voltage versus time intensity gate waveform 283 during which the route segment indicator line, the vertical deviation line, the aircraft circle and the aircraft line are sequentially formed by the tube 222. Recovery or flyback periods are also indicated by the waveform 283. This four phase period is continuously repetitive. It is to be noted that within the principles of the invention, the circle 252 may be etched onto the center of the screen 226 rather than being formed in response to the computer 232.

Thus, there has been described a navigation director system in which a route segment indicator line is maintained on a displayed chart or map and represents a portion of a commanded or a desired navigation route. The principles of the invention are applicable to any type of navigation such as for aircraft, ships or submarines. Also, the principles of the invention are applicable to any indication or presentation at any applicable location. As the aircraft progresses or moves in position relative to the route, the route segment line remains the same length but represents a different total position on the displayed map. When the actual aircraft position as indicated by an aircraft symbol, varies from the flight path, the route segment line moves to a position away from the aircraft symbol so that the desired route is properly positioned relative to the aircraft position. In order to magnify the error, a shorter line at the center of the route segment line is displaced laterally a predetermined multiple of the distance off course, the latter being shown by the distance between the aircraft symbol said the route segment line. The position of the vernier deviation line is on the side of the route segment line opposite from the aircraft symbol. When the aircraft is on the commanded route, the vernier deviation line becomes contiguous with the route segment line. In the illustrated system utilizing cams, the vernier deviation line is displaced to the edge of the display surface in response to aircraft position error and remains there while only the route segment line moves, the vernier line at the edge of the screen providing a continuous indication of an error condition. In the illustrated cathode ray tube, a similar limiting of the maximum movement of the vernier deviation line may be provided by the computer in accordance with the principles of the invention. Also, the route segment indicator line may be limited to a maximum movement as shown by the cam or as provided by the computer. In one arrangement, the route segment line has a gap in the middle thereof substantially the length of the vernier deviation line for clarity. It is to be noted that the principles of the invention also includes a continuous route segment indicator line. Although the navigation concept has been illustrated in a first arrangement of moving mechanical slots, or in a second arrangement with proper control of a cathode ray tube, the scope of the invention includes other arrangements for providing the navigation system of the invention. Also, the principles of the invention includes moving aircraft symbols rather than a moving chart display as in the illustrated system.

What is claimed is:

1. In a system for navigating a craft over a map area and of the type including a display unit with a display surface having a center point, an improvement comprising first means for displaying a first line indication at a first distance from the center point, second means for displaying a second line indication at a second distance from said center point, third means including means for storing a plurality of maps and for displaying one of said maps on said surface, fourth control means for applying signals to said first means representative of the location of a segment of a navigation route relative to the map location at said center point, and fifth control means for applying signals to said second means representative of an amplified value of the distance between the location of the segment of navigation route relative to the map location at said center point.

2. The combination of claim 1 further including sixth means for developing an aircraft symbol at the center point of said display, and seventh control means for applying signals to said sixth means so that said aircraft symbol points in the direction of travel of said craft relative to the map display.

3. A system for controlling a visual display of a craft being navigated on a selected route comprising first means for displaying a map indication of a selected area on said visual display, second means for displaying a symbol of said craft on said visual display, third means for displaying a first elongated indication of a desired navigation path on said visual display at a selected first distance from said symbol, fourth means for displaying a second elongated indication on said visual display substantially parallel to said first elongated indication and at a selected second distance from said symbol, fifth means for controlling said third means so that said selected first distance represents the variation of said craft from said selected route, and sixth means for controlling said fourth means so that the selected second distance is a predetermined function of said selected first distance.

4. The combination of claim 3 further including seventh means for controlling said first means to display said symbol at a fixed center point on said display surface and so that said symbol points in the direction of movement of said craft on said map indication.

5. The combination of claim 4 further including control means for providing a maximum limit to the movement of said second elongated indication.

6. In an aircraft navigation system for navigating said aircraft over a selected route, of the type including a display unit with a display surface having a center point representnig the position of said aircraft and on which a map is displayed, an improvement comprising first means for displaying a first line indication representing a segment of a selected route, said first line indication having a gap at the center thereof, second means for displaying a second line indication parallel to said first line and of a length substantially equal to said gap, third control means for applying signals to said first means to move said first line with said gap laterally from said center point a distance corresponding to the aircraft's off-route error, and fourth control means for applying signals to said second means to move said second line indication laterally a distance, from said center point, which is a predetermined function of the distance of said first line indication from said center point as controlled by said third means.

7. The arrangement of claim 6 further including fifth means for displaying an aircraft symbol at said center point, and sixth control means for applying signals to said fifth means so that said aircraft symbol points in the direction representing the movement of said aircraft.

References Cited

UNITED STATES PATENTS

| | | | |
|---|---|---|---|
| 2,637,848 | 5/1953 | Cunningham. | |
| 2,732,550 | 1/1956 | Reedy | 73—178 |
| 2,960,906 | 11/1960 | Fogel. | |
| 2,998,600 | 8/1961 | Majendie | 340—27 XR |
| 2,999,237 | 9/1961 | Cypser et al. | 340—27 XR |
| 3,277,484 | 10/1966 | Bostwick | 340—27 XR |

NORTON ANSHER, Primary Examiner

R. P. GREINER, Assistant Examiner

U.S. Cl. X.R.

73—178; 116—129; 343—107; 353—13